No. 829,663. PATENTED AUG. 28, 1906.
J. C. MAURER.
GYROSCOPE.
APPLICATION FILED AUG. 8, 1904.

UNITED STATES PATENT OFFICE.

JOHN CHRISTOPH MAURER, OF CHICAGO, ILLINOIS.

GYROSCOPE.

No. 829,663.   Specification of Letters Patent.   Patented Aug. 28, 1906.

Application filed August 8, 1904. Serial No. 219,921.

*To all whom it may concern:*

Be it known that I, JOHN CHRISTOPH MAURER, a citizen of the United States, residing in Chicago, Illinois, have invented certain new and useful Improvements in Gyroscopes, of which the following is a specification.

My invention relates to improvements in gyroscopes in which an adjusting screw or screws axially coincident with the axis of the wheel carry boxes provided with ball-bearings which are adjustable to the length of the axle and in means for shielding the device from harm and at the same time adding a further feature of novelty and other minor points.

I attain said ends by a construction substantially as illustrated in the hereto appended drawings, in which—

Figure 1:
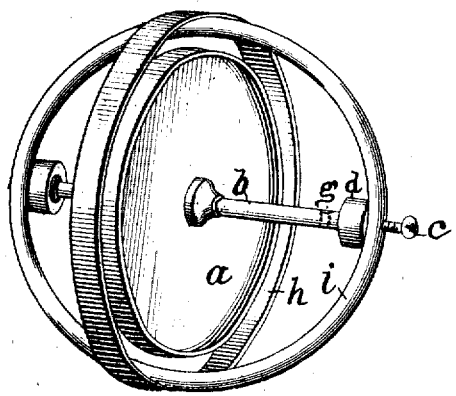
Figure 2:
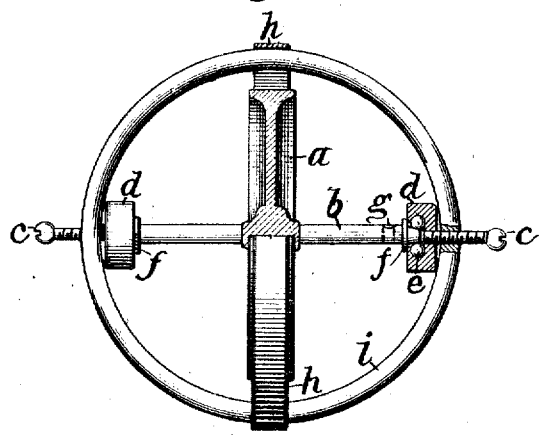

Figure 1 shows my said new gyroscope in perspective. Fig. 2 shows a plan view partly in section.

Like reference-letters denote like parts throughout.

The wheel, consisting of the parts $a\ b\ g$ and its ring $i$ are of the usual construction; but the ends of the axle are pointed for ball-bearings and run in boxes $d$, provided with balls $e$, which are held to place by the screws $c$, which pass through the axle-ring $i$ and are threaded into the bottom of the boxes $d$, but so adjusted as not to touch the axle ends. The friction or fit of the boxes and screws may be made strong, so as to securely hold said parts in place. When the parts are assembled and it is found that the axle is loose longitudinally, one of the boxes $d$ is turned upon its screw until the desired tightness is attained, and thereby great accuracy of fit, which is necessary without friction, and consequently proportionally increased running time, is attained, as well as cheapness of construction. To both prevent injury to the wheel in falling and at the same time secure another novel feature, I place a stout band $h$ over the outside of the ring $i$, whereby the wheel $a$ may cause the rolling of said band on a level surface. The axle has hole $g$ to receive and hold the end of a string, from which it is wound on the axle, and close to the box $d$ is a flange or guard $f$, whereby is prevented the possibility of the string, being caught and wound into the axle end or box by careless unreeling of the string. Only one axial or adjusting screw is shown in Fig. 1. The box $d$ at the opposite end may be fastened to the axle-ring $i$ in any known or convenient way which for general purposes is sufficient. The screw or screws $c$ work tightly through the ring $i$. The wheel and its axle and its flange are rigidly united.

What I claim is—

1. The combination with a rigidly-united wheel and axle, of an axle-ring, and axle-bearings therein, and a band, exterior said axle-ring, in the plane of said wheel.

2. The combination with a rigidly-united wheel, axle and flange near axle end, of an axle-ring and axle-bearings therefor and means to adjust, axially, said bearings and axle.

3. The combination with a rigidly-united wheel, axle and axle-flange, of an axle-ring, axle-boxes, means to hold said axle-boxes, and means to adjust said boxes, axially, to the wheel-axle.

4. The combination with a wheel and axle provided with means to wind a cord on its axle and to hold the cord from its axle-box, of an axle-ring, axle-boxes, and supports for said axle-boxes, said axle-boxes adjustable, axially, and a band exterior to said ring and in the plane of said wheel.

5. The combination with a wheel and axle provided with means to reel a cord thereon, of an axle-ring, axle-boxes with axes coincident with the wheel-axis within said ring, bearing-balls in said boxes and means to adjust said boxes axially.

6. The combination with a wheel and axle and means thereon to reel a cord, of an axle-ring and a band exterior to said ring and in the plane of said wheel.

J. CHRISTOPH MAURER.

Witnesses:
WM. ZIMMERMAN.
J. F. PARKS.